(12) United States Patent
Choi et al.

(10) Patent No.: US 11,489,427 B2
(45) Date of Patent: Nov. 1, 2022

(54) SOUND VIBRATION ACTUATOR WITH THREE VIBRATION ASSEMBLIES AND DIFFERENT FREQUENCIES

(71) Applicant: Mplus CO., LTD., Suwon-si (KR)

(72) Inventors: Jun Kun Choi, Suwon-si (KR); Yong Jin Kim, Suwon-si (KR); Yeon Ho Son, Suwon-si (KR); Yong Tae Kim, Suwon-si (KR); Dong Su Moon, Suwon-si (KR); Seok Jun Park, Suwon-si (KR); Tae Hoon Lee, Suwon-si (KR)

(73) Assignee: MPLUS CO., LTD., Suwon-si (KR)

( * ) Notice: Subject to any disclaimer, the term of this patent is extended or adjusted under 35 U.S.C. 154(b) by 388 days.

(21) Appl. No.: 16/704,016

(22) Filed: Dec. 5, 2019

(65) Prior Publication Data

US 2020/0295647 A1  Sep. 17, 2020

(30) Foreign Application Priority Data

Oct. 24, 2018 (KR) .......................... 10-2018-0127316

(51) Int. Cl.
*H02K 33/18* (2006.01)
*H02K 33/12* (2006.01)
*B06B 1/04* (2006.01)

(52) U.S. Cl.
CPC ............. *H02K 33/18* (2013.01); *H02K 33/12* (2013.01); *B06B 1/045* (2013.01)

(58) Field of Classification Search
CPC .. H02K 7/1869; H02K 7/1876; H02K 7/1892; H02K 33/00; H02K 33/02;
(Continued)

(56) References Cited

U.S. PATENT DOCUMENTS 2,789,177 A * 4/1957 Brockway .............. H01H 50/76
   335/93
3,400,316 A * 9/1968 Konrad .................. H02K 33/02
   327/461

(Continued)

FOREIGN PATENT DOCUMENTS

JP          2007-129678 A      5/2007
KR   10-2006-0009763 A      2/2006

(Continued)

OTHER PUBLICATIONS

KIPO Office Action dated Jan. 23, 2020 in connection with Korean Patent Application No. 10-2018-0127316 which corresponds to the above-referenced U.S. application.

(Continued)

*Primary Examiner* — Maged M Almawri
(74) *Attorney, Agent, or Firm* — LRK Patent Law Firm

(57) ABSTRACT

A sound vibration actuator includes: a casing having an internal space formed by an underside casing part, a side periphery casing part, and a top casing part; a first vibration assembly disposed in the internal space of the casing; a second vibration assembly disposed between the first vibration assembly and the top casing part in such a manner as to be coupled to the top casing part; an elastic member whose one surface coupled to the first vibration assembly; and a third vibration assembly disposed between the first vibration assembly and the underside casing part in such a manner as to be coupled to the underside casing part. The sound vibration actuator includes at least three or more vibration assemblies disposed therein, thereby obtaining at least three or more resonance frequencies.

9 Claims, 5 Drawing Sheets

(58) Field of Classification Search
CPC ........ H02K 33/16; H02K 35/00; H02K 35/02;
H02K 35/04; B06B 1/04; B06B 1/045
USPC ........ 310/25, 15, 12.01, 81, 80, 321, 20, 21,
310/28–30, 36–37; 381/400, 401, 402,
381/406, 413, 421; 359/824
See application file for complete search history.

(56) References Cited

U.S. PATENT DOCUMENTS

| | | | | |
|---|---|---|---|---|
| 3,501,745 A * | 3/1970 | Beckman | | H01H 51/32 361/207 |
| 3,602,842 A * | 8/1971 | Smith | | G04C 3/10 318/128 |
| 3,609,419 A * | 9/1971 | Greater | | G04B 17/045 968/126 |
| 4,154,559 A * | 5/1979 | Enomoto | | F04B 45/047 417/413.1 |
| 4,555,682 A * | 11/1985 | Gounji | | H03H 9/562 333/186 |
| 4,639,905 A * | 1/1987 | Goodloe | | G01V 1/155 367/75 |
| 4,689,973 A * | 9/1987 | Hershberger | | D06F 37/304 68/23.7 |
| 4,697,581 A * | 10/1987 | Endo | | A61H 23/0218 601/78 |
| 5,111,697 A * | 5/1992 | Habermann | | H02K 33/00 73/668 |
| 5,397,955 A * | 3/1995 | Takagi | | H02N 2/08 310/323.03 |
| 5,543,956 A * | 8/1996 | Nakagawa | | G02B 26/085 359/872 |
| 6,057,554 A * | 5/2000 | Plesko | | H03K 17/955 250/221 |
| 6,218,767 B1 * | 4/2001 | Akada | | H02N 2/0085 310/323.02 |
| 6,323,572 B1 * | 11/2001 | Kinoshita | | H02K 1/2766 310/156.55 |
| 6,413,117 B1 * | 7/2002 | Annerino | | H01R 12/7076 439/500 |
| 6,731,187 B2 * | 5/2004 | Kurihara | | H03H 9/0514 333/192 |
| 7,193,346 B2 * | 3/2007 | Kim | | H02K 7/061 310/81 |
| 7,262,526 B2 * | 8/2007 | Shiga | | H02K 15/03 310/156.28 |
| 7,355,305 B2 * | 4/2008 | Nakamura | | H02K 33/06 310/36 |
| 7,382,510 B2 * | 6/2008 | Yoda | | H02N 1/006 310/309 |
| 7,518,287 B2 * | 4/2009 | Hirasawa | | H01L 41/096 310/323.02 |
| 7,671,493 B2 * | 3/2010 | Takashima | | G06F 3/016 310/15 |
| 7,911,098 B2 * | 3/2011 | Lee | | H02K 33/16 310/20 |
| 7,999,421 B2 * | 8/2011 | Kim | | H02K 33/18 310/15 |
| 8,179,010 B2 * | 5/2012 | Ogami | | H02K 1/2766 29/598 |
| 8,222,782 B2 * | 7/2012 | Saito | | H02K 7/063 310/68 B |
| 8,237,314 B2 * | 8/2012 | Lee | | H02K 33/18 310/15 |
| 8,269,379 B2 * | 9/2012 | Dong | | H02K 33/16 310/28 |
| 8,278,786 B2 * | 10/2012 | Woo | | H02K 33/16 310/15 |
| 8,288,898 B2 * | 10/2012 | Jun | | H02K 33/16 310/34 |
| 8,400,027 B2 * | 3/2013 | Dong | | H02K 33/16 310/25 |
| 8,461,969 B2 * | 6/2013 | An | | H02K 33/06 318/132 |
| 8,587,162 B2 * | 11/2013 | Kagami | | A61C 17/32 310/38 |
| 8,624,449 B2 * | 1/2014 | Kim | | H02K 33/16 310/28 |
| 8,624,450 B2 * | 1/2014 | Dong | | H02K 33/16 310/20 |
| 8,643,229 B2 * | 2/2014 | Park | | H02K 33/16 310/15 |
| 8,648,502 B2 * | 2/2014 | Park | | H02K 33/16 310/15 |
| 8,749,113 B2 * | 6/2014 | Masunaga | | H02N 1/006 310/40 MM |
| 8,766,494 B2 * | 7/2014 | Park | | H02K 35/02 310/25 |
| 8,829,741 B2 * | 9/2014 | Park | | B06B 1/045 310/25 |
| 8,836,189 B2 * | 9/2014 | Lee | | H02K 7/085 310/90 |
| 8,878,401 B2 * | 11/2014 | Lee | | H02K 33/16 310/15 |
| D726,795 S * | 4/2015 | Huang | | D15/147 |
| 9,048,718 B2 * | 6/2015 | Zhang | | H02K 33/18 |
| 9,225,265 B2 * | 12/2015 | Oh | | H02N 2/001 |
| 9,252,648 B2 * | 2/2016 | Furukawa | | H02K 7/1876 |
| 9,312,744 B2 * | 4/2016 | Akanuma | | B06B 1/045 |
| 9,467,033 B2 * | 10/2016 | Jun | | H02K 33/16 |
| 9,543,816 B2 * | 1/2017 | Nakamura | | H02K 33/16 |
| 9,553,497 B2 * | 1/2017 | Kim | | B06B 1/045 |
| 9,614,425 B2 * | 4/2017 | Jin | | H02K 33/12 |
| 9,748,827 B2 * | 8/2017 | Dong | | H02K 33/16 |
| 9,762,110 B2 * | 9/2017 | Wang | | H02K 33/16 |
| 9,831,415 B2 * | 11/2017 | Park | | B06B 1/0648 |
| 9,871,432 B2 * | 1/2018 | Mao | | H02K 33/16 |
| 9,966,827 B2 * | 5/2018 | Wang | | H02K 33/16 |
| 10,008,894 B2 * | 6/2018 | Mao | | H02K 1/34 |
| 10,033,257 B2 * | 7/2018 | Zhang | | H02K 33/12 |
| 10,063,128 B2 * | 8/2018 | Wang | | H02K 33/16 |
| 10,199,889 B2 * | 2/2019 | Piech | | H02K 1/27 |
| 10,333,362 B2 * | 6/2019 | Lambert | | H02K 1/02 |
| 10,491,067 B2 * | 11/2019 | Fraser | | H02K 1/2786 |
| 2001/0042983 A1 * | 11/2001 | Kinoshita | | H02J 3/42 290/44 |
| 2002/0109424 A1 * | 8/2002 | Iwabuchi | | H04R 9/06 310/81 |
| 2003/0094861 A1 * | 5/2003 | Shimizu | | H02K 33/10 310/36 |
| 2004/0169425 A1 * | 9/2004 | Aihara | | B06B 1/045 310/15 |
| 2006/0002577 A1 * | 1/2006 | Won | | B06B 1/045 381/396 |
| 2006/0066164 A1 * | 3/2006 | Kim | | H02K 7/063 310/81 |
| 2007/0194635 A1 * | 8/2007 | Miura | | H02K 33/16 381/87 |
| 2007/0228858 A1 * | 10/2007 | Malmberg | | H02K 1/2766 310/156.01 |
| 2008/0129130 A1 * | 6/2008 | Mun | | H02K 5/225 310/40 MM |
| 2009/0036807 A1 * | 2/2009 | Habatjou | | A61H 23/0263 601/134 |
| 2009/0096299 A1 * | 4/2009 | Ota | | B06B 1/045 310/25 |
| 2009/0243410 A1 * | 10/2009 | Kleibl | | B06B 1/166 405/232 |
| 2009/0267423 A1 * | 10/2009 | Kajiwara | | H02K 33/02 310/38 |
| 2010/0213773 A1 * | 8/2010 | Dong | | H02K 33/16 310/25 |
| 2010/0259112 A1 * | 10/2010 | Chung | | H02K 41/033 310/12.18 |
| 2010/0289357 A1 * | 11/2010 | An | | H02K 5/1677 310/81 |
| 2010/0302752 A1 * | 12/2010 | An | | H02K 33/06 361/807 |

(56) References Cited

U.S. PATENT DOCUMENTS

| | | | | |
|---|---|---|---|---|
| 2011/0006618 A1* | 1/2011 | Lee | B06B 1/045 | 310/25 |
| 2011/0018364 A1* | 1/2011 | Kim | H02K 33/18 | 310/20 |
| 2011/0018367 A1* | 1/2011 | Kim | B06B 1/045 | 310/25 |
| 2011/0062803 A1* | 3/2011 | Lee | H02K 33/18 | 310/29 |
| 2011/0068640 A1* | 3/2011 | Choi | H02K 5/04 | 310/25 |
| 2011/0074228 A1* | 3/2011 | Kim | H02K 33/16 | 310/29 |
| 2011/0074229 A1* | 3/2011 | Kim | H02K 15/14 | 310/29 |
| 2011/0089772 A1* | 4/2011 | Dong | H02K 33/16 | 310/25 |
| 2011/0101797 A1* | 5/2011 | Lee | H02K 33/16 | 310/29 |
| 2011/0101798 A1* | 5/2011 | Lee | H02K 33/16 | 310/29 |
| 2011/0115310 A1* | 5/2011 | Dong | H02K 33/16 | 310/28 |
| 2011/0115311 A1* | 5/2011 | Dong | H02K 33/16 | 310/28 |
| 2011/0127858 A1* | 6/2011 | Park | B06B 1/045 | 310/25 |
| 2011/0133577 A1* | 6/2011 | Lee | H02K 33/18 | 310/15 |
| 2011/0156500 A1* | 6/2011 | Dong | H02K 33/16 | 310/25 |
| 2011/0169347 A1* | 7/2011 | Miyamoto | G06F 3/016 | 310/12.21 |
| 2011/0198945 A1* | 8/2011 | Nakagawa | H02K 33/16 | 310/12.25 |
| 2011/0203061 A1* | 8/2011 | Takahashi | H02K 33/18 | 310/38 |
| 2011/0227426 A1* | 9/2011 | Lee | H02K 33/18 | 310/25 |
| 2011/0241451 A1* | 10/2011 | Park | B06B 1/045 | 310/25 |
| 2011/0254782 A1* | 10/2011 | Park | B06B 1/045 | 345/173 |
| 2011/0266892 A1* | 11/2011 | Wauke | H02K 33/18 | 310/25 |
| 2011/0278960 A1* | 11/2011 | Jeon | B06B 1/045 | 310/25 |
| 2011/0291497 A1* | 12/2011 | Choi | H02K 33/18 | 310/25 |
| 2011/0316361 A1* | 12/2011 | Park | H02K 33/18 | 310/25 |
| 2012/0032535 A1* | 2/2012 | Park | H02K 35/02 | 310/25 |
| 2012/0049660 A1* | 3/2012 | Park | B06B 1/045 | 310/25 |
| 2012/0104875 A1* | 5/2012 | Park | H02K 33/16 | 310/25 |
| 2012/0108299 A1* | 5/2012 | Yang | H02K 33/16 | 455/567 |
| 2012/0112565 A1* | 5/2012 | Lee | H02K 33/16 | 310/20 |
| 2012/0153748 A1* | 6/2012 | Wauke | H02K 33/16 | 310/25 |
| 2012/0169148 A1* | 7/2012 | Kim | H02K 33/16 | 310/25 |
| 2012/0169151 A1* | 7/2012 | Dong | H02K 33/16 | 310/25 |
| 2012/0170792 A1* | 7/2012 | Li | H04R 9/066 | 381/412 |
| 2012/0187780 A1* | 7/2012 | Bang | H02K 33/16 | 310/25 |
| 2012/0313459 A1* | 12/2012 | Zhang | H02K 33/18 | 310/25 |
| 2012/0319506 A1* | 12/2012 | Shim | H02K 33/16 | 310/25 |
| 2013/0099600 A1* | 4/2013 | Park | B06B 1/045 | 310/15 |
| 2013/0119787 A1* | 5/2013 | Yu | B06B 1/045 | 310/25 |
| 2013/0134804 A1* | 5/2013 | Kim | B06B 1/045 | 310/25 |
| 2013/0169072 A1* | 7/2013 | Oh | B06B 1/045 | 310/36 |
| 2013/0229070 A1* | 9/2013 | Akanuma | H02K 33/00 | 310/25 |
| 2013/0241321 A1* | 9/2013 | Akanuma | B06B 1/045 | 310/25 |
| 2013/0342067 A1* | 12/2013 | Jang | H02K 29/03 | 310/156.38 |
| 2014/0062224 A1* | 3/2014 | Kim | H02K 33/16 | 310/15 |
| 2014/0103751 A1* | 4/2014 | Furukawa | H02K 35/02 | 310/25 |
| 2014/0152126 A1* | 6/2014 | Kim | B06B 1/045 | 310/25 |
| 2014/0152148 A1* | 6/2014 | Oh | B06B 1/0648 | 310/321 |
| 2014/0219494 A1* | 8/2014 | Kim | H04R 9/046 | 381/400 |
| 2014/0306556 A1* | 10/2014 | Kim | H02K 33/16 | 310/25 |
| 2015/0015117 A1* | 1/2015 | Lee | B06B 1/04 | 310/20 |
| 2015/0028710 A1* | 1/2015 | Oka | H02K 1/27 | 29/598 |
| 2015/0042099 A1* | 2/2015 | Muniz | H02K 1/27 | 290/55 |
| 2015/0048620 A1* | 2/2015 | Muniz | H02K 1/2773 | 290/55 |
| 2015/0070792 A1* | 3/2015 | Terajima | G02B 7/08 | 359/824 |
| 2015/0086066 A1* | 3/2015 | Yan | H04R 9/025 | 381/412 |
| 2015/0123498 A1* | 5/2015 | Yang | H02K 33/16 | 310/25 |
| 2015/0123499 A1* | 5/2015 | Park | H02K 33/16 | 310/25 |
| 2015/0137627 A1* | 5/2015 | Katada | H02K 33/16 | 310/25 |
| 2015/0181344 A1* | 6/2015 | Jiang | H04R 31/006 | 381/400 |
| 2015/0194870 A1* | 7/2015 | Kim | H02K 33/18 | 310/25 |
| 2015/0328664 A1* | 11/2015 | Kim | B06B 1/0644 | 310/323.01 |
| 2016/0126790 A1* | 5/2016 | Piech | H02K 1/2706 | 310/156.12 |
| 2016/0164390 A1* | 6/2016 | Furukawa | H02N 2/185 | 310/25 |
| 2016/0192075 A1* | 6/2016 | Shibata | H02K 33/18 | 310/28 |
| 2016/0198262 A1* | 7/2016 | Wang | H04R 7/18 | 381/392 |
| 2016/0218607 A1* | 7/2016 | Oh | H02K 33/16 | |
| 2016/0254736 A1* | 9/2016 | Jin | H02K 33/16 | 310/25 |
| 2016/0336842 A1* | 11/2016 | Chun | H02K 33/16 | |
| 2016/0381462 A1* | 12/2016 | Wang | H04R 9/06 | 381/400 |
| 2017/0012517 A1* | 1/2017 | Huang | H02K 33/00 | |
| 2017/0033653 A1* | 2/2017 | Wang | H02K 33/16 | |
| 2017/0033654 A1* | 2/2017 | Wang | H02K 33/16 | |
| 2017/0033657 A1* | 2/2017 | Mao | H02K 33/16 | |
| 2017/0110920 A1* | 4/2017 | Mao | H02K 1/34 | |
| 2017/0214306 A1* | 7/2017 | Katada | H02K 33/16 | |
| 2017/0222535 A1* | 8/2017 | Baek | H02K 11/30 | |

(56) References Cited

U.S. PATENT DOCUMENTS

2017/0250596 A1* 8/2017 Son .................. H02K 1/34
2017/0288519 A1* 10/2017 Kim ................. H02K 33/00
2018/0021812 A1* 1/2018 Akanuma .......... H02K 33/00
310/25

FOREIGN PATENT DOCUMENTS

| KR | 10-2012-0078550 A | 7/2012 |
| KR | 10-2013-0015722 A | 2/2013 |
| KR | 10-2016-0020921 A | 2/2016 |
| KR | 10-2017-0115124 A | 10/2017 |
| KR | 10-2018-0010288 A | 1/2018 |
| KR | 10-1834304 B1 | 3/2018 |
| KR | 10-2018-0059973 A | 6/2018 |
| KR | 10-1911369 B1 | 10/2018 |

OTHER PUBLICATIONS

KIPO Office Action dated Feb. 28, 2020 in connection with Korean Patent Application No. 10-2018-0127316 which corresponds to the above-referenced U.S. application.

* cited by examiner (a)

(b)

SOUND VIBRATION ACTUATOR WITH THREE VIBRATION ASSEMBLIES AND DIFFERENT FREQUENCIES

CROSS REFERENCE TO RELATED APPLICATION

The present application claims priority to Korean Patent Application No. 10-2018-0127316, filed in the Korean Intellectual Property Office on Oct. 24, 2018, the entire content of which is incorporated herein by reference.

BACKGROUND OF THE INVENTION

1. Field of the Invention

The present invention relates to a sound vibration actuator, and more particularly, to a sound vibration actuator that is capable of being provided with a plurality of vibration assemblies adapted to generate resonance frequencies in various bands.

2. Description of Related Art

Generally, mobile terminals like smartphones have vibration functions (haptic functions) of interfacing call forwarding as well as of interfacing key input, event occurrence, and application execution to a user.) A vibration motor converting an electromagnetic force into a mechanical driving force is used as a driving device to generate up and down vibrations.

Meanwhile, as a mobile terminal has had a bezel-less design that has a screen-to-body ratio higher than 90%, recently, there are suggested new technologies wherein a sound speaker, receiver hole, and so on, which are disposed on a front surface of the mobile terminal in a conventional practice, are located inside the mobile terminal. As a result, there is developed a sound vibration actuator as one of such new technologies that controls a frequency of a vibration motor using an electromagnetic force to generate a desired sound.

So as to allow the sound vibration actuator to be located inside the mobile terminal, the sound vibration actuator has to have excellent response characteristics as well as vibration forces greater than given levels in various frequency bands.

SUMMARY OF THE INVENTION

Accordingly, the present invention has been made in view of the above-mentioned problems occurring in the related art, and it is an object of the present invention to provide a sound vibration actuator that is capable of generating resonance frequencies in various bands.

It is another object of the present invention to provide a sound vibration actuator that is capable of being provided with a plurality of vibration assemblies adapted to generate vibrations in the range of a low frequency to a high frequency.

It is yet another object of the present invention to provide a sound vibration actuator that is capable of being mounted on an external sound generation device to function as both of a vibration generation device and a sound generation device.

The technical problems to be achieved through the present invention are not limited as mentioned above, and other technical problems not mentioned herein will be obviously understood by one of ordinary skill in the art through the following description.

To accomplish the above-mentioned objects, according to the present invention, there is provided a sound vibration actuator including: a casing having an internal space formed by an underside casing part, a side periphery casing part, and a top casing part; a first vibration assembly disposed in the internal space of the casing; a second vibration assembly disposed between the first vibration assembly and the top casing part in such a manner as to be coupled to the top casing part; an elastic member whose one surface coupled to the first vibration assembly; and a third vibration assembly disposed between the first vibration assembly and the underside casing part in such a manner as to be coupled to the underside casing part.

According to the present invention, desirably, the second vibration assembly includes a coil for receiving power from the outside to generate an induced electromotive force and a coil yoke made of a magnetic material.

According to the present invention, desirably, the coil of the second vibration assembly is disposed on top of the coil yoke.

According to the present invention, desirably, the third vibration assembly includes a plate coupled to the underside casing part, a coil seated on a center of the plate to receive power from the outside and to thus generate an induced electromotive force, and a coil yoke made of a magnetic material.

According to the present invention, desirably, the coil of the third vibration assembly is disposed on underside of the coil yoke.

According to the present invention, desirably, the first vibration assembly includes: a magnet; a weight fitted to an outer periphery of the magnet; and a yoke fitted to a periphery along which the magnet and the weight come into contact with each other.

According to the present invention, desirably, the coil of the second vibration assembly and the coil of the third vibration assembly have different impedances from each other.

According to the present invention, desirably, the plate includes a protrusion adapted to seat the coil on a center thereof.

According to the present invention, desirably, the protrusion has a hollow shape.

According to the present invention, desirably, the plate includes at least one or more holes formed around the protrusion.

According to the present invention, desirably, each hole has a shape of a cone whose peak is cut.

According to the present invention, desirably, the plate whose outer periphery is coupled to the underside casing part.

According to the present invention, desirably, the first vibration assembly, the second vibration assembly and the third vibration assembly are vibrated with resonance frequencies different from each other.

According to the present invention, desirably, the underside casing part, the side periphery casing part, and the top casing part are made of a magnetic material.

BRIEF DESCRIPTION OF THE DRAWINGS

The above and other objects, features and advantages of the present invention will be apparent from the following detailed description of the embodiments of the invention in conjunction with the accompanying drawings, in which.

DETAILED DESCRIPTION OF THE EMBODIMENTS

Figure 1:
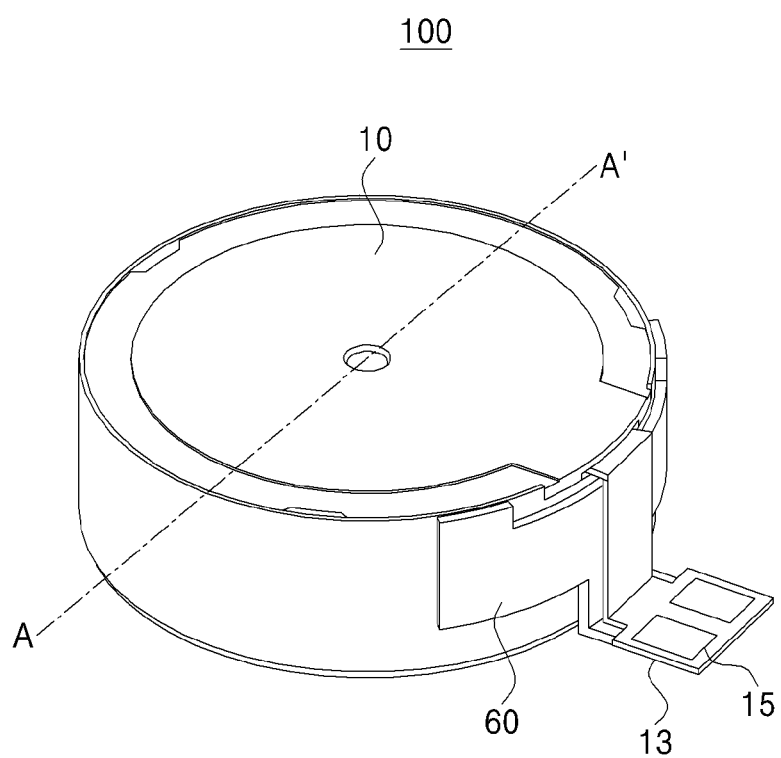
FIG. 1 is a perspective view showing a sound vibration actuator according to the present invention.

Hereinafter, the present invention will be explained in detail with reference to the attached drawings. In the description, it should be noted that the parts corresponding to those of the drawings are indicated by corresponding reference numerals. Objects, characteristics and advantages of the present invention will be more clearly understood from the detailed description as will be described below and the attached drawings. Before the present invention is disclosed and described, it is to be understood that the disclosed embodiments are merely exemplary of the invention, which can be embodied in various forms.

All terms (including technical or scientific terms) used herein, unless otherwise defined, have the same meanings which are typically understood by those having ordinary skill in the art. The terms, such as ones defined in common dictionaries, should be interpreted as having the same meanings as terms in the context of pertinent technology, and should not be interpreted as having ideal or excessively formal meanings unless clearly defined in the specification. An expression referencing a singular value additionally refers to a corresponding expression of the plural number, unless explicitly limited otherwise by the context.

In this application, terms, such as "comprise", "include", or "have", are intended to designate those characteristics, numbers, steps, operations, elements, or parts which are described in the specification, or any combination of them that exist, and it should be understood that they do not preclude the possibility of the existence or possible addition of one or more additional characteristics, numbers, steps, operations, elements, or parts, or combinations thereof.

FIG. 1 is a perspective view showing a sound vibration actuator 100 according to the present invention.

Before the present invention is described with reference to FIG. 1, first, the sound vibration actuator 100 according to the present invention is a device that generates vibrations and sounds produced by the vibrations. In detail, the sound vibration actuator 100 is adapted to generate vibrations through electromagnetic forces of internal components and is also adapted to allow at least one surface thereof to be coupled to an external sound generator S to generate sounds produced by the vibrations.

As shown in FIG. 1, the sound vibration actuator 100 has a shape of a flat cylinder and is configured to have a printed circuit board 13 bent on a side periphery thereof. The printed circuit board 13 has an input terminal 15 disposed on one end thereof.

In more detail, the input terminal 15 for supplying power to the sound vibration actuator 100 is drawn from a given small space between the top and the side periphery of a casing 10 of the sound vibration actuator 100. In this case, the input terminal 15 is a power input terminal, and further, a board seating holder 60 is disposed on a side peripheral surface of the sound vibration actuator 100 to the same bent shape as the printed circuit board 13 so as to protect the printed circuit board 13 and the input terminal 15.

Of course, the input terminal 15, which supplies power to an interior of the sound vibration actuator 100, may be drawn from a given small space between the underside and the side periphery of the casing 10 of the sound vibration actuator 100.

Figure 2:
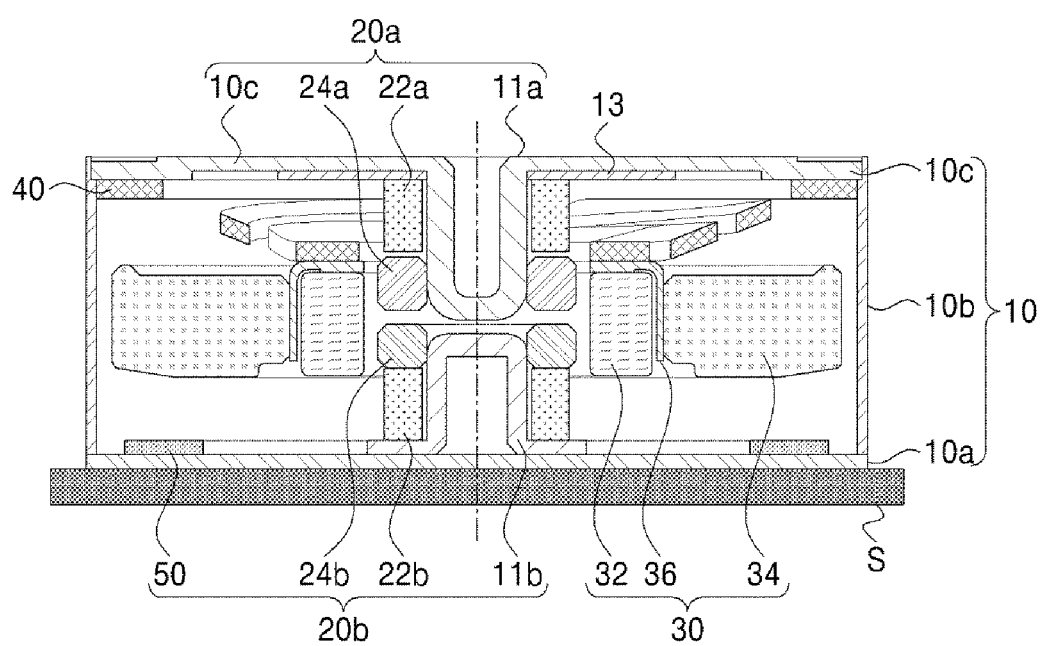
FIG. 2 is a sectional view taken along the line A-A' of FIG. 1.
Figure 3:
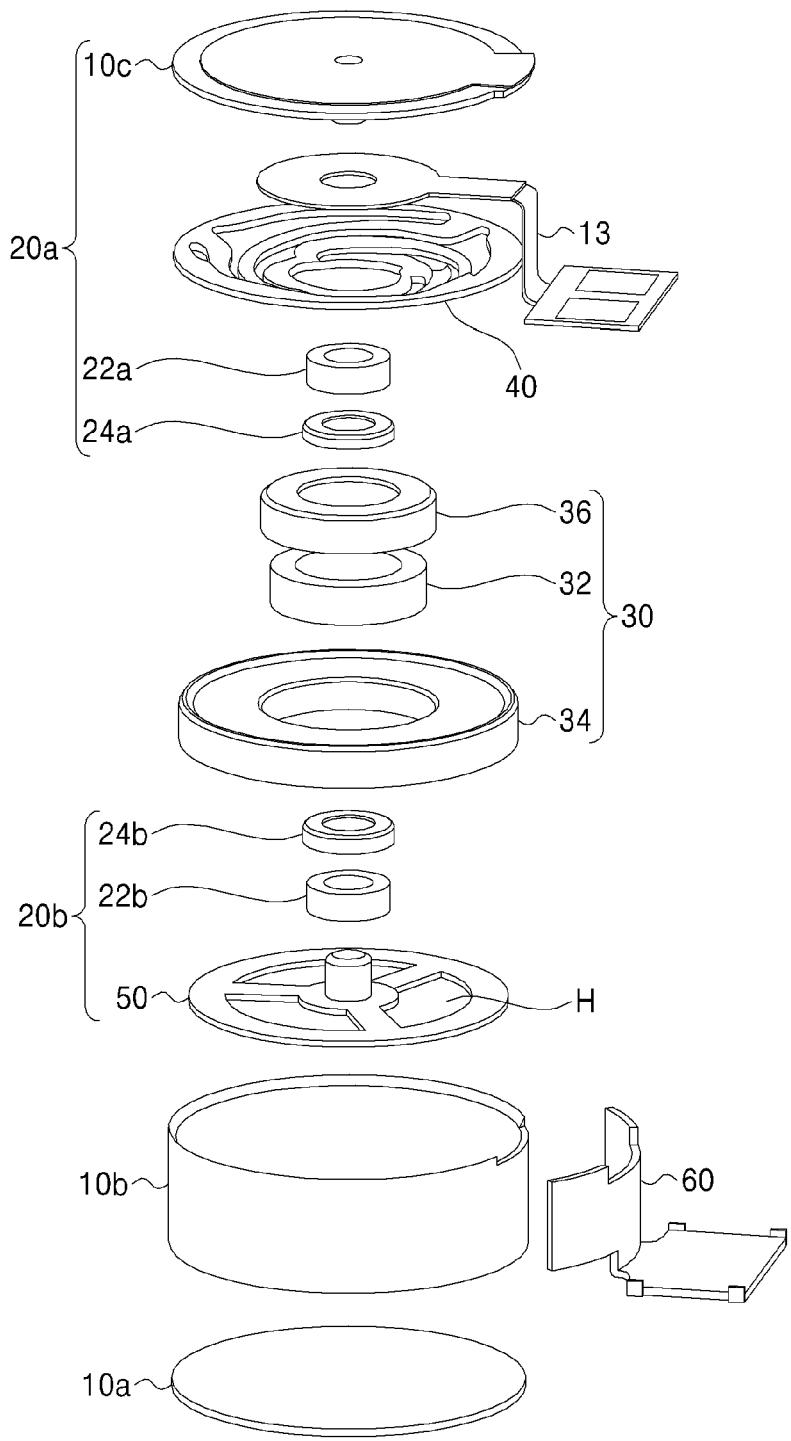
FIG. 3 is an exploded perspective view showing the sound vibration actuator according to the present invention.

FIG. 2 is a sectional view taken along the line A-A' of FIG. 1, and FIG. 3 is an exploded perspective view showing the sound vibration actuator 100 according to the present invention.

As shown in FIGS. 2 and 3, the sound vibration actuator 100 includes the casing 10, first to third vibration assemblies 30, 20a and 20b, and an elastic member 40.

First, the casing 10 has a space formed therein to accommodate the first to third vibration assemblies 30, 20a and 20b and the elastic member 40 therein. The casing 10 is constituted of an underside casing part 10a, a side periphery casing part 10b, and a top casing part 10c that are coupled to each other by means of caulking, bonding or welding.

The top casing part 10c has a protrusion 11a formed at the center thereof so as to seat the second vibration assembly 20a thereonto. The protrusion 11a, which has a hollow shape protruding inward from the center of the top casing part 10c, can be very easily formed by means of press or deep drawing. If the protrusion 11a has such a hollow shape, advantageously, manufacturing and coupling processes can be simple, a weight of the sound vibration actuator 100 can be reduced, a variety of magnetic materials can be inserted later into the hollow portion of the protrusion 11a from the outside to adjust the amount of magnetic flux.

Further, the top casing part 10c may be an acoustic diaphragm, and accordingly, the second vibration assembly 20a is vibrated by an electromagnetic force generated between the internal components thereof, thereby generating sounds.

The side periphery casing part 10b is provided to the same shape as the outer peripheries of the top casing part 10c and the underside casing part 10a. According to the present invention, the side periphery casing part 10b has a shape of a cylinder, but without being limited thereto, of course, it may have a sectional shape of a square or polygon according to shapes of the top casing part 10c and the underside casing part 10a. Also, the elastic member 40 disposed in the internal space of the casing 10 has the same sectional shape as the square or polygonal side periphery casing part 10b.

The underside casing part 10a can be fixed to the external sound generator S. To do this, the underside casing part 10a has an adhesive member disposed on one surface thereof, and otherwise, it has fixing holes (not shown) punched thereon. On the other hand, the external sound generator S includes various kinds of mechanisms for generating sounds, for example, a display module.

Only the underside casing part 10a is fixed to the external sound generator S, and other parts are not fixed to any external devices, so that if power is supplied to the sound vibration actuator 100, the second vibration assembly 20a disposed at the inner surface of the top casing part 10c or the third vibration assembly 20b disposed at the inner surface of the underside casing part 10a is vibrated to allow the external sound generator s connected to the sound vibration actuator 100 to generate vibrations in the range of a low frequency band to a high frequency band. If the second vibration assembly 20a or the third vibration assembly 20b is vibrated together with the first vibration assembly 30, in more detail, vibrations with a high frequency in the range of 5000 to 10100 Hz as well as with a low frequency of 100 Hz can be generated.

Further, the casing 10 having the underside casing part 10a, the side periphery casing part 10b, and the top casing part 10c is made of a magnetic material so as to optimize a magnetic field generated from the second vibration assembly 20a or the third vibration assembly 20b disposed therein. Accordingly, the underside casing part 10a, the side periphery casing part 10b, and the top casing part 10c are made of the same magnetic material as each other, and otherwise, they may be made of different magnetic materials from each other according to a user's selection.

Like this, the sound vibration actuator 100 has the first to third vibration assemblies 30, 20a and 20b disposed in the internal space thereof, thereby generating vibrations in the range of a low frequency band to a high frequency band, and if the sound vibration actuator 100 is built in a mobile terminal, sounds in the range of a low frequency band to a high frequency band can be generated from a display surface, without any use of a receiver on the mobile terminal, thereby maximizing the use of the display surface in the mobile terminal.

Next, the second vibration assembly 20a has a coil 22a and a coil yoke 24a. In this case, the coil 22a and the coil yoke 24a are coupled to top of the casing 10, that is, the top casing part 10c, and since only the outer periphery of the top casing part 10c is fixed to the side periphery casing part 10b, the remaining region thereof is not fixed to any component, so that in a process where the coil 22a and the coil yoke 24a are vibrated, the top casing part 10c can be vibrated together.

Meanwhile, the coil 22a of the second vibration assembly 20a may be a sound coil that generates magnetic fields having different directions and strengths. In more detail, if an alternating current is applied to the coil 22a, an alternating magnetic field is generated from the coil 22a, so that the top casing part 10c coming into contact with the coil 22a is vibrated to a signal of resonance frequency (the $2^{nd}$ frequency) in an audible frequency range, thereby generating sounds.

The coil 22a and the coil yoke 24a of the second vibration assembly 20a are fitted to the protrusion 11a of the top casing part 10c, and the coil 22a is disposed on top of the coil yoke 24a. Also, the coil 22a and the coil yoke 24a have a shape of a ring, but without being limited thereto, of course, they may have various shapes fitted to the protrusions 11a.

The coil yoke 24a of the second vibration assembly 20a is fittedly disposed on the outer peripheral surface of the protrusion 11 in parallel with the coil 22a, is made of a magnetic material, and serves to amplify the electromagnetic force generated from the coil 22a.

In the process where the second vibration assembly 20a is vibrated according to an induced electromotive force generated from the coil 22a and the coil yoke 24a, if the induced electromotive force generated corresponds to a resonance frequency of the first vibration assembly 30 disposed parallel to the second vibration assembly 20a, the first vibration assembly 30 can be operated. Accordingly, if it is designed that the first vibration assembly 30 has the resonance frequency (first frequency) in the range of 100 to 300 Hz, an alternating current corresponding to the resonance frequency is supplied to the second vibration assembly 20a, so that the first vibration assembly 30 can be operated. However, the resonance frequency band of the first vibration assembly 30 can be changed according to design conditions thereof.

The first vibration assembly 30 is located around the coil 22a and includes a magnet 32, a weight 34, and a yoke 36. If the alternating current is applied to the coil 22a of the second vibration assembly 20a, an alternating magnetic field is generated from the coil 22a, and accordingly, the magnet 32 is cooperatively operated with the alternating magnetic field, so that the magnet 32 is vibrated up and down together with weight 34. The first vibration assembly 30 will also be vibrated in the case of supplying the alternating current to the coil 22b of the third vibration assembly 20b. It will be explained later in more detail.

The magnet 32 of the first vibration assembly 30 is disposed around the coil yokes 24a 24b and can vibrates up and down cooperating with the alternating magnetic field generated from the coils 22a 22b. Though the magnet 32 is one in FIG. 2, it may include two or more magnets coupled to each other. If the two or more magnets are coupled to each other, the electromagnetic force can be stronger than that generated from one magnet.

Meanwhile, a magnetic fluid (not shown) can be applied to one of the side surfaces of the magnet 32 or the coil yokes 24a 24b to prevent direct contact between them, thereby suppressing the noise or damage caused by direct collision between them. Further, because of its viscosity, the magnetic fluid can help the magnet 32 stop vibration more quickly after turning off the power.

The weight 34 of the first vibration assembly 30 is disposed around the magnet 32 and serves to amplify the up and down vibrations of the magnet 32 by means of its self weight. Further, an outer diameter of the weight 34 is smaller than an inner diameter of the side periphery casing part 10b, so that in a process where the entire first vibration assembly 30 is vibrated up and down, the contact of the first vibration assembly 30 with the side periphery casing part 10b is prevented to ensure the reliability of the sound vibration actuator 100.

The yoke 36 of the first vibration assembly 30 is disposed between the magnet 32 and the weight 34, and serves to form a closed magnetic circuit capable of allowing the magnetic field generated from the magnet 32 to gently flow.

Next, the third vibration assembly 20b is placed between the first vibration assembly 30 and the underside casing part 10a in such a manner as to be coupled to the underside casing part 10a. In detail, the third vibration assembly 20b includes a coil 22b and a coil yoke 24b, like the second vibration assembly 20a, and further includes a plate 50 disposed on top of the underside casing part 10a.

In this case, the plate 50 is a plate-shaped vibration member seated onto the top of the underside casing part 10a in such a manner as to allow an outer periphery thereof to be fixed to the underside casing part 10a, while not allowing the remaining area thereof to be fixed thereto, so that in a process where the coil 22b and the coil yoke 24b are vibrated, the plate 50 can be vibrated together.

Meanwhile, the plate 50 can be an acoustic diaphragm having at least one or more holes H, and as the coil 22b and the coil yoke 24b are vibrated, the plate 50 generates sounds. At this time, each hole H has a shape of a cone whose peak is cut, and the resonance frequency of the third vibration assembly 20b can be changed according to the width of the hole H. Also, the holes H are symmetrically arranged around the center of the plate 50.

The plate 50 has a protrusion 11b formed on the center thereof to seat the coil 22b thereon. The coil 22b and the coil yoke 24b are disposed around the protrusion 11 in parallel. The coil 22b of the third vibration assembly 20b is disposed on underside of the coil yoke 24b.

The protrusion 11b can be insertedly formed inwardly from the center of the plate 50 by means of press or deep drawing process very easily and has a hollow shape. By means of the protrusion 11b, the plate 50 can support the coil 22b and coil yoke 24b.

Further, the coil 22b of the third vibration assembly 20b may be a sound coil that generates magnetic fields having different directions and strengths. In more detail, if an alternating current is applied to the coil 22b, an alternating magnetic field is generated from the coil 22b, so that the plate 50 coming into contact with the coil 22b is vibrated to a signal of resonance frequency (the 3rd frequency) in an audible frequency range, thereby generating sounds.

In the process where the third vibration assembly 20b is vibrated according to an induced electromotive force generated from the coil 22b and the coil yoke 24b, if the induced electromotive force generated corresponds to a resonance frequency of the first vibration assembly 30 disposed parallel to the third vibration assembly 20b, the first vibration assembly 30 can be operated. Accordingly, if it is designed that the first vibration assembly 30 has the resonance frequency (first frequency) in the range of 100 to 300 Hz, an alternating current corresponding to the resonance frequency is supplied to the third vibration assembly 20b, so that the first vibration assembly 30 can be operated. However, the resonance frequency band of the first vibration assembly 30 can be changed according to design conditions thereof.

The coil yoke 24b of the third vibration assembly 20b is made of a magnetic material and serves to collect the magnetic flux generated from the coil 22b and to amplify the induced electromotive force.

Like this, the third vibration assembly 20b is disposed on the top of the underside casing part 10a and is thus vibrated around the plate 50 having a protrusion 11b. The components of the third vibration assembly 20b have a shape of a circle or ring according to the shape of the casing 10, without being limited thereto.

The elastic member 40 is disposed on the top casing part 10c to support the first vibration assembly 30. The elastic member 40 is decreased in diameter as it goes from the outer peripheral to the inner center and protruded downward direction. The inner surface part of the elastic member 40 is fixed to the first vibration assembly 30, and the outer surface thereof is coupled to the top casing part 10c.

The elastic member 40 serves not only to support the first vibration assembly 30, but also to amplify the up and down vibrations of the first vibration assembly 30 by means of the given elasticity thereof. The elastic member 40 can be made of some magnetic materials.

On the other hand, the elastic member 40 may come into contact with the underside casing part 10a, not with the top casing part 10c, so as to support the first vibration assembly 30. In this case, an inner center of the elastic member 40 comes into contact with the first vibration assembly 30, and an outer periphery thereof comes into contact with the underside casing part 10a.

If the elastic member 40 is coupled to the top casing part 10c or the underside casing part 10a by means of welding, it can have a high fixing force so that a desired resonance frequency can be more accurately set.

Next, the sound vibration actuator 100 includes a thin FPC board or the printed circuit board 13. For example, the printed circuit board 13 is disposed on the underside of the top casing part 10c in such a manner as to allow a portion thereof to be exposed outward from the space formed by the side periphery casing part 10b to supply power to the coil 22a of the second vibration assembly 20a. In more detail, the printed circuit board 13 has a hole formed at the center thereof, and the hole has the same diameter as the protrusion 11a, so that the printed circuit board 13 can be disposed on the underside of the top casing part 10c. Also, the printed circuit board 13 comes into direct contact with the coil 22a of the second vibration assembly 20a. Further, the printed circuit board 13 is drawn from the internal space formed by the top casing part 10c in such a manner as to be extended downward along the side periphery casing part 10b and to allow the end thereof to be bent at the location of the underside casing part 10a in parallel to the casing 10, so that it can receive the power from the outside.

Otherwise, the printed circuit board 13 is disposed on the top of the underside casing part 10a in such a manner as to allow a portion thereof to be exposed outward from the space formed by the side periphery casing part 10b to supply power to the coil 22b of the third vibration assembly 20b. In this case, the printed circuit board 13 is drawn from the internal space formed by the underside casing part 10a in such a manner as to be parallel to the external sound generator S.

Lastly, the sound vibration actuator 100 includes the board seating holder 60 for seating the thin printed circuit board 13. In more detail, the board seating holder 60 is disposed on an outer peripheral surface of the side periphery casing part 10b so as to safely locate or fix the printed circuit board 13.

Up to now, an explanation on the internal structure of the sound vibration actuator 100 according to the present invention has been given. According to the present invention, the sound vibration actuator 100 has the first to third vibration assemblies 30, 20a and 20b adapted to generate vibrations having three resonance frequencies different from each other, so that the external sound generator S coupled to the sound vibration actuator 100 can generate sounds in the range of the low frequency band to the high frequency band. Accordingly, the sound vibration actuator 100 can be applied to various fields.

Hereinafter, operations of the first to third vibration assemblies 30, 20a and 20b of the sound vibration actuator 100 and the resonance frequencies generated by the operations will be explained with reference to FIGS. 4 and 5.

Figure 4:
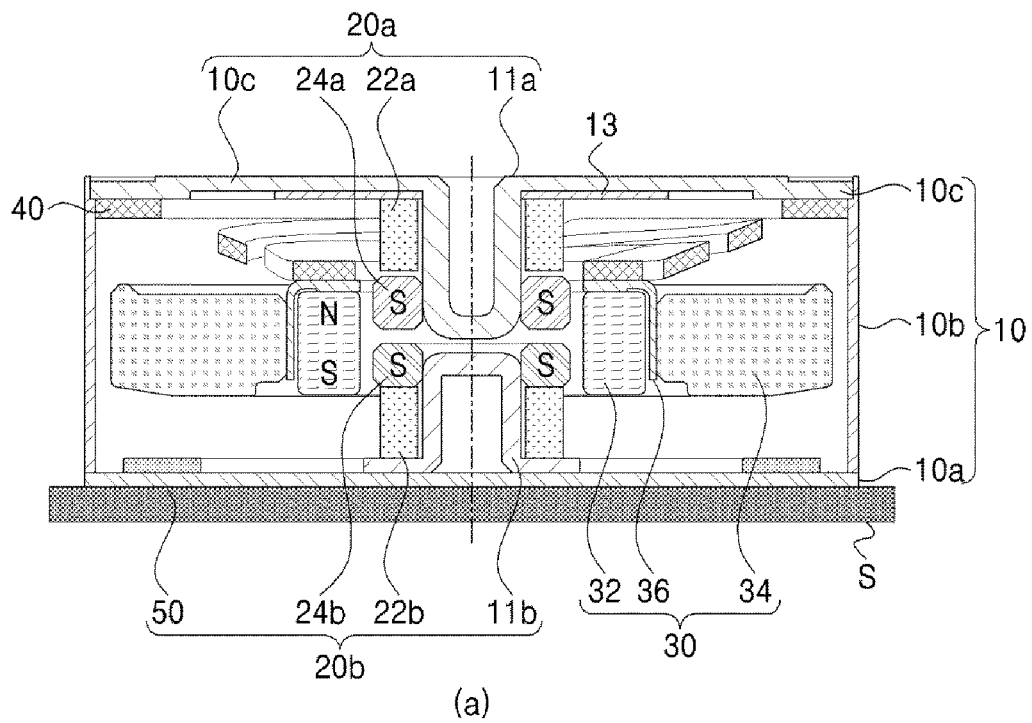
FIG. 4 is a sectional view showing polarities of vibration assemblies of the sound vibration actuator of FIG. 2.
Figure 4:
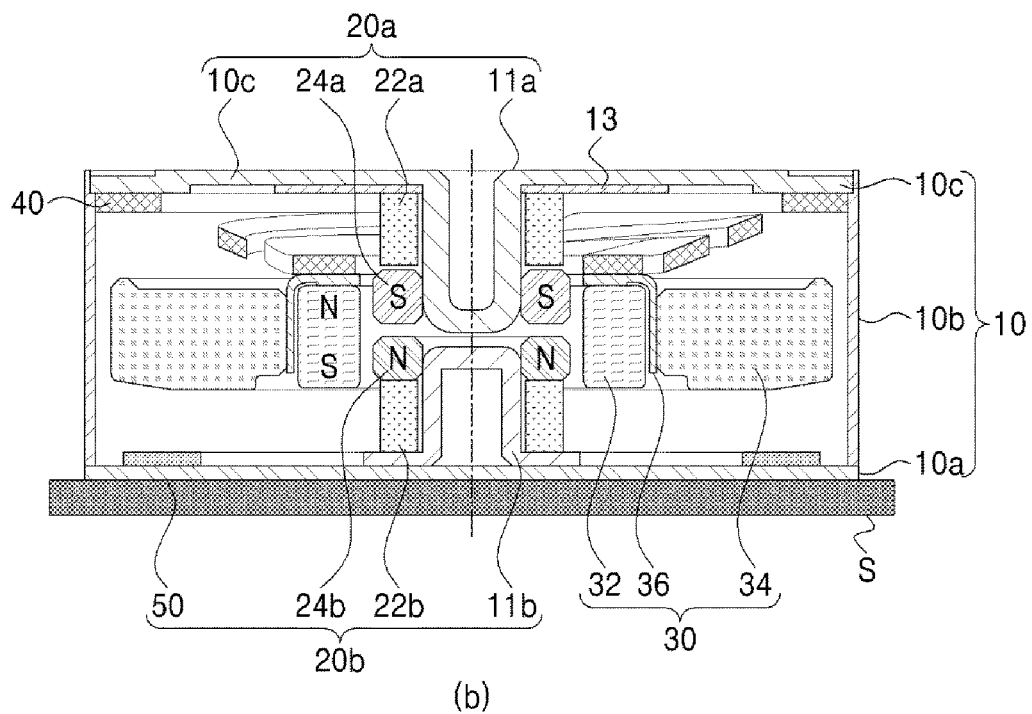
Figure 5:
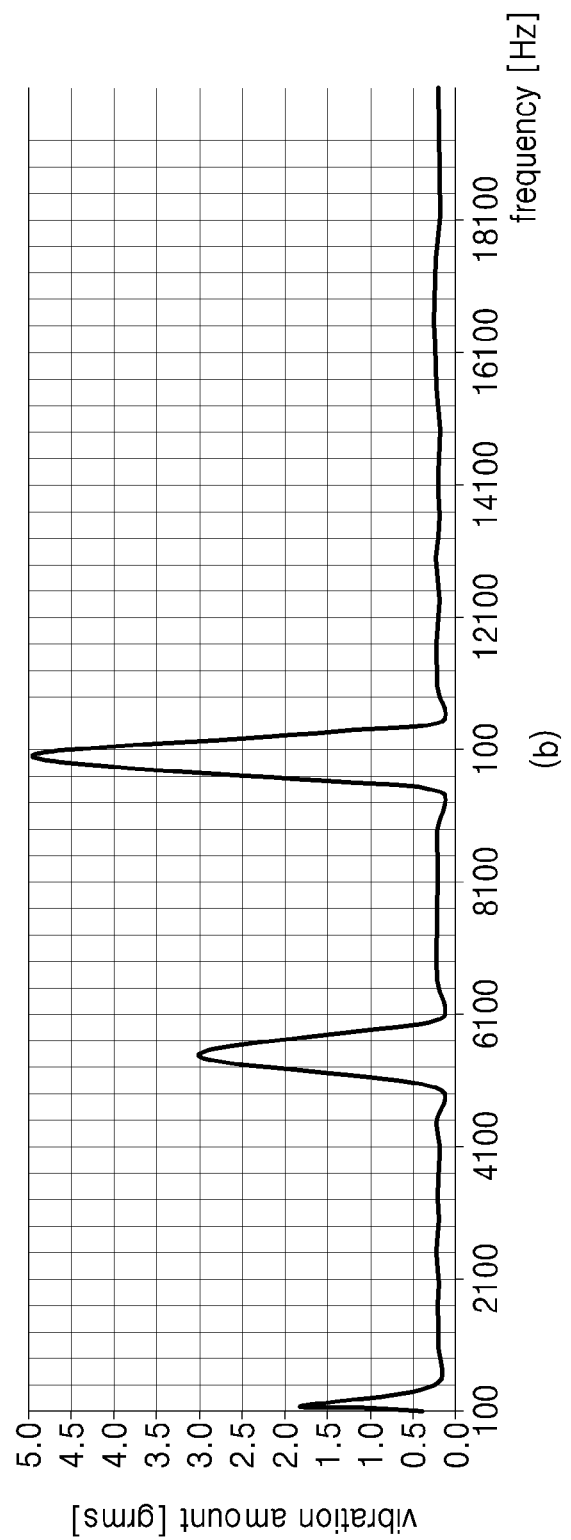
FIG. 5 is a graph showing a relationship between frequencies and vibration dose values in the sound vibration actuator according to the present invention.

FIG. 4 is a sectional view showing polarities of the first to third vibration assemblies 30, 20a and 20b of the sound vibration actuator 100 of FIG. 2, and FIG. 5 is a graph showing a relationship between frequencies and vibration dose values in the sound vibration actuator 100 according to the present invention.

As shown in FIG. 4, the magnet 32 of the first vibration assembly 30 is vibrated up and down by means of the influence of an electric field generated from the coil 22a or 22b of the second vibration assembly 20a or the third vibration assembly 20b, and the weight 34 and the yoke 35 coupled to the magnet 32 are vibrated together, so that the whole first vibration assembly 30 is vibrated up and down.

In the vibration process, the first frequency can be determined by mass m1 of the first vibration assembly 30 and an elastic modulus k1. In more detail, the first frequency is determined by means of the following mathematical expression 1. The mass m1 of the first vibration assembly 30 is the total mass of the magnet 32, the weight 34, and the yoke 36, and the elastic modulus k1 is an elastic modulus of the elastic member 40.

$$\text{frequency} = \frac{1}{2\pi}\sqrt{\frac{k}{m}} \qquad \text{[Mathematical expression 1]}$$

If the sound vibration actuator 100 is mounted on an external device, the first frequency of the first vibration assembly 30 disposed at the center of the sound vibration actuator 100 corresponds to a natural frequency used for vibrations sensed by a user holding the external device, and if the external device is a sound generation device, the first frequency gives an influence on low sound characteristics of the sound generator.

Referring to FIG. 5, it can be checked that the first vibration assembly 30 generates the vibration in a low frequency band having the first frequency, that is, a center frequency of 100 Hz, thereby giving an influence on the low sound characteristics.

Referring again to FIG. 4, the second vibration assembly 20a includes the top casing part 10c, and as mentioned above, only the outer periphery of the top casing part 10c is fixed to the side periphery casing part 10b, while the remaining region thereof is being not fixed to any part, so that if power is applied to the coil 22a of the second vibration assembly 20a, the second vibration assembly 20a is vibrated up and down.

In the vibration process, a second frequency can be determined by mass m2 of the second vibration assembly 20a and an elastic modulus k2. In more detail, the mass m2 of the second vibration assembly 20a is the total mass of the coil 22a, the coil yoke 24a and the top casing part 10c, and the elastic modulus k2 is an elastic modulus of the top casing part 10c.

As the elastic modulus k2 becomes big because of the thickness of the top casing part 10a, like this, the second frequency of the second vibration assembly 20a disposed on the upper side of the sound vibration actuator 100 becomes in the range of intermediate to high frequency bands over 5000 Hz, and if the sound generation device and the sound vibration actuator 100 are coupled to each other, the second frequency can give an influence on the middle and high sound characteristics.

Lastly, the coil 22b and the coil yoke 24b of the third vibration assembly 20b are vibrated up and down together with the plate 50 disposed on top of the underside casing part 10a in the internal space of the casing 10.

Since the plate 50 is coupled to the underside casing part 10a, on the other hand, the third vibration assembly 20b includes the underside casing part 10a, but as the underside casing part 10a can be fixed to the external sound generator S by means of separate fixing members, it has relatively smaller up and down displacement than other components of the third vibration assembly 20b at the time when it is vibrated up and down, so that it does not have any big influence on vibrations and frequencies.

Accordingly, mass m3 of the third vibration assembly 20b is the total mass of the coil 22b, the coil yoke 24b and the plate 50, and an elastic modulus k3 is an elastic modulus of the plate 50.

Like this, a third frequency of the third vibration assembly 20b disposed on the lower side of the sound vibration actuator 100 becomes in the range of intermediate to high frequency bands over 5000 Hz according to the areas of the holes H of the plate 50, and the larger the areas of the holes H are, the greater the elastic modulus k3 becomes, so that the third frequency can have a large value. In detail, if the sound vibration actuator 100 having the third vibration assembly 20b is coupled to the sound generation device, the third frequency can give an influence on the middle and high sound characteristics.

Referring to FIG. 5, it can be checked that vibrations in the high frequency bands are generated from the second or third frequency by means of the mass m2 or m3 and the elastic modulus k2 or k3 of the second vibration assembly 20a or the third vibration assembly 20b. In detail, the vibrations have center frequencies of about 5000 and 10100 Hz. However, the elastic moduli k2 and k3 are adjusted according to the designs of the top casing part 10c and the plate 50, and accordingly, vibrations in the range of various high frequency bands can be generated.

Referring back to FIG. 4, the coils 22a and 22b of the second vibration assembly 20a and the third vibration assembly 20b are arranged in such a manner as to allow poles of facing areas (areas of the coil yokes 24a and 24b) to be the same as each other, as shown, or different from each other.

If the alternating current is applied to the second vibration assembly 20a or the third vibration assembly 20b, in detail, the pole of the coil yoke 24a or 24b serving as an electromagnet and the pole of the top casing part 10c or the plate 50 are formed alternately with N and S poles. Through the attraction and repulsion forces of the coil yoke 24a or 24b to and from the magnet 32 having poles N and S on the upper and lower sides thereof, the vibration of the second vibration assembly 20a or the third vibration assembly 20b can be amplified.

Moreover, the coils 22a and 22b have different impedance values, so that the sound vibration actuator 100 can generate new vibration modes (new resonance frequencies) according to inputted voltages or frequencies.

Meanwhile, the alternative current can be applied to only one of the second vibration assembly 20a and the third vibration assembly 20b so as to improve the characteristics of the external sound generator S connected thereto in the operating process of the sound vibration actuator 100.

Up to now, an explanation on the operations of the first to third vibration assemblies of the sound vibration actuator 100 according to the present invention has been given. According to the present invention, the first to third vibration assemblies generate natural vibration modes according to their mass and shapes to produce different frequencies in the range of low, intermediate, and high frequency bands according to the respective modes, and their vibration is transferred to the external sound generator S to basically prevent a sound pressure (dB) from falling.

As described above, the sound vibration actuator according to the present invention includes at least three or more vibration assemblies disposed therein, thereby obtaining at least three or more resonance frequencies.

In addition, the sound vibration actuator according to the present invention can generate sounds in the range of low to high frequency bands from the external sound generator coupled thereto.

Further, the sound vibration actuator according to the present invention can generate the resonance frequencies in the low, intermediate and high frequency bands, without any change in the internal structure thereof, thereby basically preventing the sound pressure dB from falling.

While the present invention has been described with reference to the particular illustrative embodiments, it is not to be restricted by the embodiments but only by the appended claims. It is to be appreciated that those skilled in the art can change or modify the embodiments without departing from the scope and spirit of the present invention.

What is claimed is:

1. A sound vibration actuator comprising:
    a casing (10) having an internal space formed by an underside casing part (10*a*), a side periphery casing part (10*b*), and a top casing part (10*c*);
    a first vibration assembly (30) disposed in the internal space of the casing (10);
    a second vibration assembly (20*a*) disposed between the first vibration assembly (30) and the top casing part (10*c*) in such a manner as to be coupled to the top casing part (10*c*);
    an elastic member (40) whose one surface coupled to the first vibration assembly (30); and
    a third vibration assembly (20*b*) disposed between the first vibration assembly (30) and the underside casing part (10*a*) in such a manner as to be coupled to the underside casing part (10*a*),
    wherein the second vibration assembly (20*a*) and the third vibration assembly (20*b*) comprise coils (22*a* and 22*b*) and coil yokes (24*a* and 24*b*),
    wherein the third vibration assembly (20*b*) further comprises a plate (50) coupled to the underside casing part (10*a*),
    wherein the plate (50) comprises a protrusion (11*b*) adapted to seat the coil (22*b*) thereonto.

2. The sound vibration actuator according to claim 1, wherein the second vibration assembly (20*a*) is configured to have the coil (22*a*) disposed on top of the coil yoke (24*a*), and the third vibration assembly (20*b*) is configured to have the coil (22*b*) disposed on underside of the coil yoke (24*b*).

3. The sound vibration actuator according to claim 1, wherein the underside casing part (10*a*) can be fixed to an external sound generator (S).

4. The sound vibration actuator according to claim 1, wherein the first vibration assembly (30) comprises:
    a magnet (32);
    a weight (34) fitted to an outer periphery of the magnet (32); and
    a yoke (36) fitted to a periphery along which the magnet (32) and the weight (34) come into contact with each other.

5. The sound vibration actuator according to claim 1, wherein the coil (22*a*) of the second vibration assembly (20*a*) and the coil (22*b*) of the third vibration assembly (20*b*) have different impedances from each other.

6. The sound vibration actuator according to claim 1, wherein the protrusion (11*b*) has a hollow shape.

7. The sound vibration actuator according to claim 1, wherein the plate (50) comprises at least one or more holes (H) formed around the protrusion (11*b*).

8. The sound vibration actuator according to claim 1, wherein the plate (50) whose outer periphery is coupled to the underside casing part (10*a*).

9. The sound vibration actuator according to claim 1, wherein the first vibration assembly (30), the second vibration assembly (20*a*) and the third vibration assembly (20*b*) are vibrated with resonance frequencies different from each other.

* * * * *